(12) United States Patent
Suzuki et al.

(10) Patent No.: US 10,255,731 B2
(45) Date of Patent: Apr. 9, 2019

(54) DISPLAY APPARATUS AND DISPLAY METHOD

(75) Inventors: Mamoru Suzuki, Kanagawa (JP); Yoshihito Ishibashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 1273 days.

(21) Appl. No.: 12/406,566

(22) Filed: Mar. 18, 2009

(65) Prior Publication Data

US 2009/0241023 A1  Sep. 24, 2009

(30) Foreign Application Priority Data

Mar. 19, 2008  (JP) .................... 2008-072370

(51) Int. Cl.
G07B 15/00  (2011.01)
G06F 3/14  (2006.01)

(52) U.S. Cl.
CPC ............... G07B 15/00 (2013.01); G06F 3/14 (2013.01)

(58) Field of Classification Search
CPC ....... G06Q 10/02; G06Q 10/025; G07B 15/00
USPC ........................................................ 705/5
See application file for complete search history.

(56) References Cited

U.S. PATENT DOCUMENTS

| 5,754,654 A * | 5/1998 | Hiroya et al. ............ 705/76 |
| 2003/0070080 A1 * | 4/2003 | Rosen ............. G06Q 20/02 713/187 |
| 2004/0072592 A1 * | 4/2004 | Hasegawa ........ H04W 48/04 455/558 |
| 2006/0168392 A1 * | 7/2006 | Hwang .................. 711/103 |
| 2006/0188097 A1 * | 8/2006 | Taniguchi et al. .......... 380/201 |
| 2007/0299868 A1 * | 12/2007 | Huomo et al. .......... 707/104.1 |

FOREIGN PATENT DOCUMENTS

| JP | 2001-084311 | | 3/2001 | |
| JP | 2003-114979 | * | 4/2003 | ............ G06F 17/60 |
| JP | 2003-208682 | | 7/2003 | |
| JP | 2004-030063 | | 1/2004 | |
| JP | 2005-038048 | | 2/2005 | |
| JP | 2006-139526 | * | 6/2006 | ............ G07B 15/00 |

(Continued)

OTHER PUBLICATIONS

Electronic Payments International, "Asian operators begin to realise mobile dream," Lafferty Ltd., London, Apr. 2004, pp. 10-11.*

(Continued)

*Primary Examiner* — Nathan Erb
(74) *Attorney, Agent, or Firm* — Chip Law Group

(57) ABSTRACT

The present invention provides a display apparatus including a storage unit that stores information on electronic tickets; a reading unit that reads the information on electronic tickets stored in the storage unit; a determining unit that determines whether the electronic tickets are in use based on usage information of the electronic tickets included in the information on electronic tickets read by the reading unit; a display order determining unit that determines display order on a screen display of the electronic tickets based on results of the determination made by the determining unit; and a display screen generating unit that generates a display screen showing the electronic tickets according to the display order on the screen display determined by the display order determining unit.

15 Claims, 11 Drawing Sheets

(56) References Cited

FOREIGN PATENT DOCUMENTS

| | | | |
|---|---|---|---|
| JP | 2006-319832 | 11/2006 | |
| JP | 2007-531932 | 11/2007 | |
| WO | WO 2006/000557 A1 * | 1/2006 | ............. G07B 15/02 |

OTHER PUBLICATIONS

Notification of Reasons for Refusal with English language translation issued by Japanese Patent Office dated Dec. 15, 2009 in Japanese application No. 2008-072370.
Ichiro Inami, Shinkansen, "A Ride System by an Electronic Ticket", Toshiba Technical Publication, Japan, Toshiba Corporation, vol. 20-22, pp. 127-130, (2002).

* cited by examiner

FIG.3

| | ISSUE 202 | UNUSED 203 | IN USE 204 | USED 205 | DATE OF PURCHASE 206 | EXPECTED DATE OF USE 207 | DATE OF USE 208 | DEPARTURE TIME 209 | BOARDING STATION 210 | ARRIVAL TIME 211 | ARRIVAL STATION 212 | NAME OF TRAIN 213 | CAR NO. 214 | SEAT NO. 215 | SEAT 216 |
|---|---|---|---|---|---|---|---|---|---|---|---|---|---|---|---|
| TICKET1 | ● | | | ● | 20071012 | 20071101 | 20071101 | 8:00 | TOKYO | 10:20 | SENDAI | HAYATE NO. 5 | 6 | 5-A | RESERVED |
| TICKET2 | ● | | ● | | 20071115 | 20071225 | 20071225 | 12:00 | TOKYO | 13:20 | UTSUNOMIYA | YAMABIKO NO. 35 | 3 | 10-C | GREEN (FIRST CLASS) |
| TICKET3 | ● | ● | | | 20071118 | 20071230 | — | 10:00 | SENDAI | 12:30 | TOKYO | HAYATE NO. 66 | | | NON-RESERVED |
| TICKET4 | | | | | — | — | — | — | — | — | — | — | — | — | — |

Table 301:

| | Bit0 | Bit1 | Bit2 | Bit3 | Bit4 | Bit5 | Bit6 | Bit7 |
|---|---|---|---|---|---|---|---|---|
| 1Byte | ISSUE | UNUSED | IN USE | USED | | | | |
| 2Byte | EXPECTED DATE OF USE (USE ONE Byte) | | | | | | | |
| 3Byte | DEPARTURE TIME (USE ONE Byte) | | | | | | | |
| 4Byte | DETAILED DATA WRITE DESTINATION (USE ONE Byte) | | | | | | | |
| 5Byte | ISSUE | UNUSED | IN USE | USED | | | | |
| 6Byte | EXPECTED DATE OF USE (USE ONE Byte) | | | | | | | |
| 7Byte | DEPARTURE TIME (USE ONE Byte) | | | | | | | |
| 8Byte | DETAILED DATA WRITE DESTINATION (USE ONE Byte) | | | | | | | |
| 9Byte | ISSUE | UNUSED | IN USE | USED | | | | |
| 10Byte | EXPECTED DATE OF USE (USE ONE Byte) | | | | | | | |
| 11Byte | DEPARTURE TIME (USE ONE Byte) | | | | | | | |
| 12Byte | DETAILED DATA WRITE DESTINATION (USE ONE Byte) | | | | | | | |
| 13Byte | ISSUE | UNUSED | IN USE | USED | | | | |
| 14Byte | EXPECTED DATE OF USE (USE ONE Byte) | | | | | | | |
| 15Byte | DEPARTURE TIME (USE ONE Byte) | | | | | | | |
| 16Byte | DETAILED DATA WRITE DESTINATION (USE ONE Byte) | | | | | | | |

Ticket groupings: TICKET1 (1–4Byte), TICKET2 (5–8Byte), TICKET3 (9–12Byte), TICKET4 (13–16Byte).

Table 302:

| | | Bit0 | Bit1 | Bit2 | Bit3 | Bit4 | Bit5 | Bit6 | Bit7 |
|---|---|---|---|---|---|---|---|---|---|
| 1Byte | DATE OF PURCHASE | USE ONE Byte | | | | | | | |
| 2Byte | DATE OF USE | USE ONE Byte | | | | | | | |
| 3Byte | BOARDING STATION | USE TWO Bytes (STATION CODE) | | | | | | | |
| 4Byte | BOARDING STATION | | | | | | | | |
| 5Byte | ARRIVAL TIME | USE ONE Byte | | | | | | | |
| 6Byte | | | | | | | | | |
| 7Byte | ARRIVAL STATION | USE TWO Bytes (STATION CODE) | | | | | | | |
| 8Byte | ARRIVAL STATION | | | | | | | | |
| 9Byte | NAME OF TRAIN | USE TWO Bytes (CHINESE CHARACTER CODE) (FIRST LETTER) | | | | | | | |
| 10Byte | NAME OF TRAIN | | | | | | | | |
| 11Byte | NAME OF TRAIN | USE TWO Bytes (CHINESE CHARACTER CODE) (SECOND LETTER) | | | | | | | |
| 12Byte | NAME OF TRAIN | | | | | | | | |
| 13Byte | NAME OF TRAIN | USE TWO Bytes (CHINESE CHARACTER CODE) (THIRD LETTER) | | | | | | | |
| 14Byte | NAME OF TRAIN | | | | | | | | |
| 15Byte | NAME OF TRAIN | USE TWO Bytes (CHINESE CHARACTER CODE) (FOURTH LETTER) | | | | | | | |
| 16Byte | NAME OF TRAIN | | | | | | | | |
| 17Byte | NAME OF TRAIN | USE TWO Bytes (CHINESE CHARACTER CODE) (FIFTH LETTER) | | | | | | | |
| 18Byte | NAME OF TRAIN | | | | | | | | |
| 19Byte | NAME OF TRAIN | USE TWO Bytes (CHINESE CHARACTER CODE) (SIXTH LETTER) | | | | | | | |
| 20Byte | NAME OF TRAIN | | | | | | | | |
| 21Byte | NAME OF TRAIN | USE TWO Bytes (CHINESE CHARACTER CODE) (SEVENTH LETTER) | | | | | | | |
| 22Byte | NAME OF TRAIN | | | | | | | | |
| 23Byte | NAME OF TRAIN | USE TWO Bytes (CHINESE CHARACTER CODE) (EIGHTH LETTER) | | | | | | | |
| 24Byte | NAME OF TRAIN | | | | | | | | |
| 25Byte | TRAIN NO. | USE ONE Byte | | | | | | | |
| 26Byte | CAR NO. | USE ONE Byte | | | | | | | |
| 27Byte | SEAT NO. | COLUMN POSITION | | | | ROW POSITION | | | |
| 28Byte | | | | | | | | | |
| 29Byte | | | | | | | | | |
| 30Byte | | | | | | | | | |
| 31Byte | | | | | | | | | |
| 32Byte | | | | | | | | | |

//patents.google.com/

DISPLAY APPARATUS AND DISPLAY METHOD

CROSS REFERENCES TO RELATED APPLICATIONS

The present invention contains subject matter related to Japanese Patent Application JP 2008-072370 filed in the Japan Patent Office on Mar. 19, 2008, the entire contents of which being incorporated herein by reference.

BACKGROUND OF THE INVENTION

Field of the Invention

The present invention relates to a display apparatus, a display method, a program, and a display system, and more particularly, to a display apparatus, a display method, a program, and a display system for efficiently displaying information on electronic tickets.

Description of the Related Art

Currently, ticket gate operations using a contactless IC card are performed at railroad ticket gates, etc. By holding the IC card over a reader/writer installed on an automatic ticket gate, a ticket gate operation can be performed. IC cards have started to be generally and widely used due to their small size, excellent portability, and a high degree of convenience. However, to check information in an IC card, the IC card has to be held over an external reader/writer, which causes inconvenience.

In view of this, a display device such as electronic paper or an LCD panel is provided to an IC card so as to enable to display information contained in the IC card, whereby the convenience of the card is improved (e.g., Patent Document 1). By using such an IC card, railroad ticket information or the like is written to the IC card and the IC card can be used such that the ticket information is displayed on a display device as an electronic ticket.

[Patent Document 1] Japanese Patent Application Laid-Open No. 2003-208582

SUMMARY OF THE INVENTION

However, when a plurality of electronic tickets are written, since there are limits to the display area and power consumption of an IC card, there are issues that displaying all information on the written electronic tickets is low in convenience and poor in efficiency.

The present invention addresses the above-identified, and other issues associated with conventional methods and apparatuses. There is a need for a novel and improved display apparatus, display method, program, and display system that are capable of efficiently displaying information on electronic tickets on a display device of an IC card.

According to an embodiment of the present invention, there is provided a display apparatus that displays a display screen showing one or two or more electronic tickets. The display apparatus includes: a storage unit that stores information on the electronic tickets; a reading unit that reads the information on the electronic tickets stored in the storage unit; a determining unit that determines whether the electronic tickets are in use based on usage information of the electronic tickets included in the information on the electronic tickets read by the reading unit; a display order determining unit that determines display order on a screen display of the electronic tickets based on results of the determination made by the determining unit; and a display screen generating unit that generates a display screen showing the electronic tickets according to the display order on the screen display determined by the display order determining unit. When the determining unit determines that the electronic tickets are in use, the display order determining unit may give the electronic tickets a high screen display priority.

According to this configuration, information on electronic tickets stored in the storage unit is read, display order of the electronic tickets is determined by whether the electronic tickets included in the information on the electronic tickets are in use, and a display screen showing the electronic tickets is generated according to the display order. For example, by giving information on an electronic ticket determined to be in use a high display order, the electronic ticket in use is displayed on the display screen on a priority basis. Then, according to a user input, electronic tickets not in use are sequentially displayed.

By this, information on an electronic ticket in use that may be most needed by a user can be displayed on the display screen on a priority basis. Also, according to a user input, information on electronic tickets can be sequentially displayed in descending order of priority. Accordingly, desired information can be provided to the user in a short time and with low power consumption.

The determining unit may determine whether the electronic tickets are in use, unused, or used based on the usage information of the electronic tickets, and the display order determining unit may determine the display order in order of an in-use electronic ticket, an unused electronic ticket, and a used electronic ticket. According to this configuration, electronic tickets are classified into one unused, one in use, and one used, display order is determined in order of one in use, one unused, and one used, and the electronic tickets can be displayed on a display screen in the display order. By this, information on an electronic ticket that may be most needed by the user is displayed on a priority basis, enabling to efficiently provide desired information.

The display screen generating unit may generate a display screen showing an electronic ticket with a highest display order which is determined by the display order determining unit. Alternatively, the display screen generating unit may generate, according to a user input, a display screen sequentially showing the electronic tickets in descending order of the display order determined by the display order determining unit. According to this configuration, information on an electronic ticket that may be most needed by the user can be displayed on the display screen on a priority basis. Also, according to a user input, information on electronic tickets can be sequentially displayed in descending order of priority. Accordingly, desired information can be provided to the user in a short time and with low power consumption.

The display order determining unit may determine the display order of the electronic tickets based on the results of the determination, and thereafter determine the display order based on date-of-use information of the electronic tickets. Furthermore, the display order determining unit may arrange electronic tickets determined to be in use by latest date of use first, arrange electronic tickets determined to be unused by earliest date of use first, and arrange electronic tickets determined to be used by latest date of use first, and determine the display order according to orders of the respective arrangements. According to this configuration, display order can be determined based not only on usage information of electronic tickets but also on date-of-use information. By this, information can be sequentially displayed with information that may be most needed by the user given the highest priority. Also, since the priority order of information on electronic tickets is determined and held, desired information can be provided to the user in a short time and with low power consumption.

The reading unit may read display order information on the electronic tickets that may be needed for a determination made by the display order determining unit, the display order determining unit may determine display order of the electronic tickets according to the display order information on the electronic tickets, and the display screen generating unit may generate a display screen including an electronic ticket corresponding to a portion of the display order information that has a high display order which is determined by the display order determining unit. According to this configuration, among information on electronic tickets stored in the storage unit, display order information which is information on the electronic tickets that may be needed to determine display order is read and display order is determined based on usage information flags included in the display order information. Then, a display screen can be generated according to the determined display order.

By this, without reading all information on electronic tickets stored in the storage unit, the display order of the electronic tickets can be determined, enabling to reduce the amount of resources used, such as power consumption and a memory. When the user does not need to check all information stored in the IC chip 10, only such information on an electronic ticket that may be needed to be displayed is read, and thus, only by reading minimum necessary data, user's desired information can be efficiently displayed.

The storage unit may be an IC chip and the information on the electronic tickets may be stored in the IC chip by an external apparatus that can communicate with the IC chip. When the information on the electronic tickets in the IC chip is updated by the external apparatus, classification by a classifying unit and a determination of display order by the display order determining unit may be performed. According to this configuration, each time information on an electronic ticket is stored in the IC chip, display order is determined and the display order is stored in the IC chip. By this, when the user checks information on electronic tickets stored in the IC chip, information on an electronic ticket that is the latest and that may be most needed can be efficiently displayed.

According to another embodiment of the present invention, there is provided a display method performed by a display apparatus that displays a display screen showing one or two or more electronic tickets, the display method including the steps of: storing information on the electronic tickets; reading the stored information on the electronic tickets; determining whether the electronic tickets are in use based on usage information of the electronic tickets included in the read information on the electronic tickets; determining display order on a screen display of the electronic tickets based on results of the determination; and generating a display screen showing the electronic tickets according to the determined display order on the screen display.

According to another embodiment of the present invention, there is provided a program causing a computer to function as a display apparatus that displays a display screen showing one or two or more electronic tickets, the display apparatus including: a storage unit that stores information on the electronic tickets; a reading unit that reads the information on the electronic tickets stored in the storage unit; a determining unit that determines whether the electronic tickets are in use based on usage information of the electronic tickets included in the information on the electronic tickets read by the reading unit; a display order determining unit that determines display order on a screen display of the electronic tickets based on results of the determination made by the determining unit; and a display screen generating unit that generates a display screen showing the electronic tickets according to the display order on the screen display determined by the display order determining unit.

This program can cause hardware resources of a computer including, for example, a CPU, ROM, or RAM, to perform functions of components of a display apparatus such as those described above. That is, a computer using the program can be caused to function as the above-described display apparatus.

According to another embodiment of the present invention, there is provided a display system including: a display apparatus having mounted thereon a contactless communicable IC chip; a reader/writer that is contactlessly communicable with the IC chip; and a server apparatus connected to the reader/writer, wherein information on electronic tickets to be transmitted from the server apparatus through the reader/writer is stored in the IC chip, and the display apparatus includes: a reading unit that reads the information on the electronic tickets stored in the IC chip; a determining unit that determines whether the electronic tickets are in use based on usage information of the electronic tickets included in the information on the electronic tickets read by the reading unit; a display order determining unit that determines display order on a screen display of the electronic tickets based on results of the determination made by the determining unit; and a display screen generating unit that generates a display screen showing the electronic tickets according to the display order on the screen display determined by the display order determining unit.

According to the embodiment of the present invention, information on electronic tickets can be efficiently displayed on a display device of an IC card.

BRIEF DESCRIPTION OF THE DRAWINGS

FIG. 3 is an illustrative diagram for describing content of information on electronic tickets stored in an IC chip according to the first embodiment;

FIG. 9 is an illustrative diagram for describing in detail the display order information according to the second embodiment;

DETAILED DESCRIPTION OF THE PREFERRED EMBODIMENTS

Figure 1:
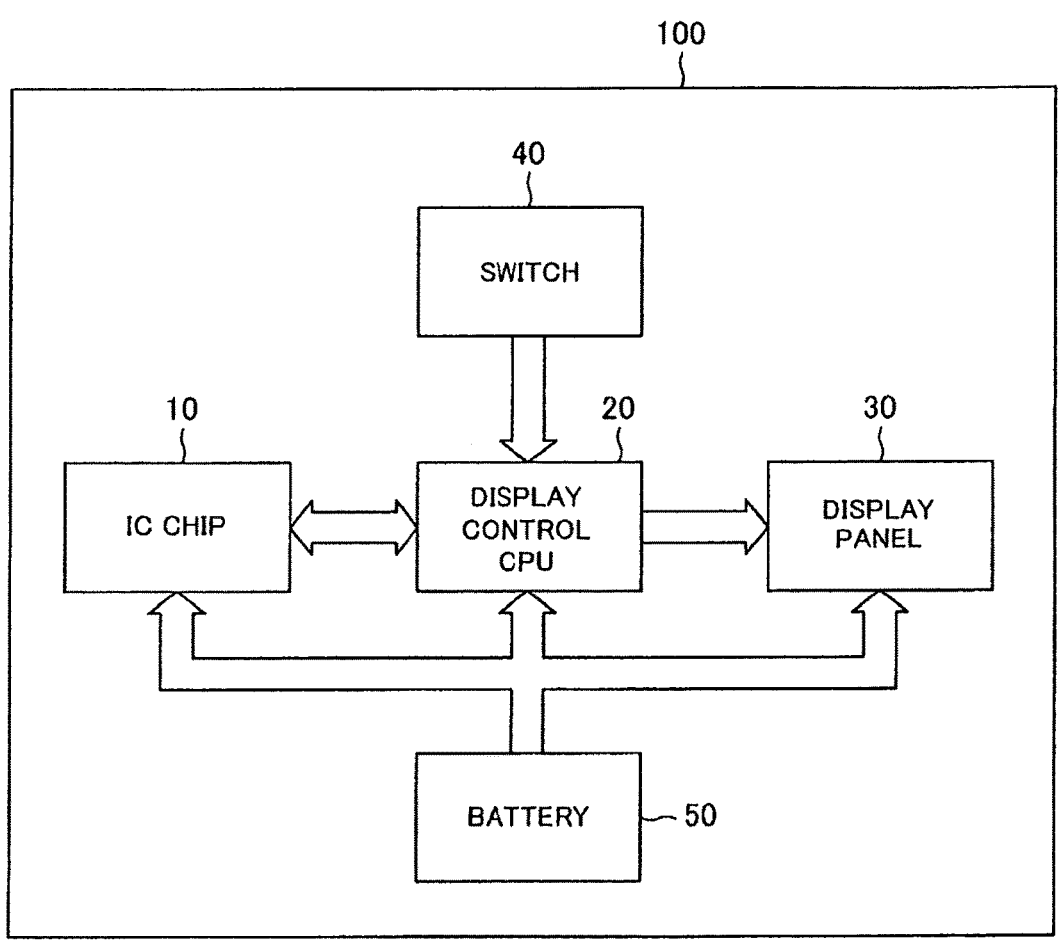
FIG. 1 is an illustrative diagram showing an exemplary configuration of a display apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)

First, an exemplary configuration of a display apparatus according to a first embodiment of the present invention will be described with reference to FIG. 1. In the following, description is made of a display apparatus according to an embodiment of the present invention being applied to a display apparatus 100 that includes an IC chip and a display device and that is capable of displaying content stored in the IC chip on the display device. An example of the display apparatus includes an IC card having mounted thereon an IC chip. As shown in FIG. 1, the display apparatus 100 includes an IC chip 10, a display control CPU 20, a display panel 30, a switch 40, and the like. The IC chip 10 is an example of a storage unit and has a function of storing information on electronic tickets, etc. The IC chip 10 may be a contact communicable IC chip that performs communication through an electrical contact or may be a contactless communicable IC chip that performs communication without using an electrical contact. Alternatively, the IC chip 10 may be a combination-type IC chip having functions of both a contact type and a contactless type.

The display control CPU 20 has a function of controlling display on the display panel 30 provided to the display apparatus 100. For example, the display control CPU 20 displays information stored in the IC chip 10 on the display panel 30 or changes display on the display panel 30 according to a user input performed through the switch 40. The display control CPU 20 will be described in detail later.

The display panel 30 is an example of a display screen and is an interface that displays information, etc., stored in the IC chip 10. Examples of the display panel 30 include display panels such as electronic paper and an LCD panel. The switch 40 is an interface having a function of accepting an input from a user, etc. Examples of the switch 40 include a button and a touch panel. A battery 50 has a function of supplying power to the IC chip 10, the display control CPU 20, the display panel 30, etc. An example of the battery 50 includes a solar cell.

As described above, the battery 50 can supply power without other apparatuses supplying power but has low power consumption. Hence, the display control CPU 20 may need to display information stored in the IC chip 10 on the display panel 30, by efficiently using small power. When it is not necessary to display all information stored in the IC chip 10, information that may be most needed by the user is displayed first, whereby the convenience of the display apparatus 100 can be increased.

In the present embodiment, the case will be described in which information on railroad tickets is written to the IC chip 10 as electronic tickets and the information on the electronic tickets is displayed on the display panel 30. Examples of the information on railroad tickets include bullet train tickets and limited express tickets. When the IC chip 10 is a contact communicable IC chip, the display apparatus 100 is inserted into an external device such as a ticket vending machine, whereby information on an electric ticket is electrically written to the IC chip 10. When the IC chip 10 is a contactless communicable IC chip, the display apparatus 100 is held over a reader/writer that is contactlessly communicable with the IC chip 10, whereby information on an electronic ticket transmitted from an external device connected to the reader/writer is written to the IC chip 10.

When information on a plurality of electronic tickets is written to the IC chip 10, information that may be most needed by the user may need to be efficiently displayed. Hence, in the present embodiment, by classifying and arranging a plurality of electronic tickets written to the IC chip 10, information that may be needed by the user is selected and efficiently displayed on a limited display area of the display device 30. Classification and arrangement of a plurality of electronic tickets will become clear by the following detailed description of the display control CPU 20. A summary of the present embodiment has been described above.

Figure 2:
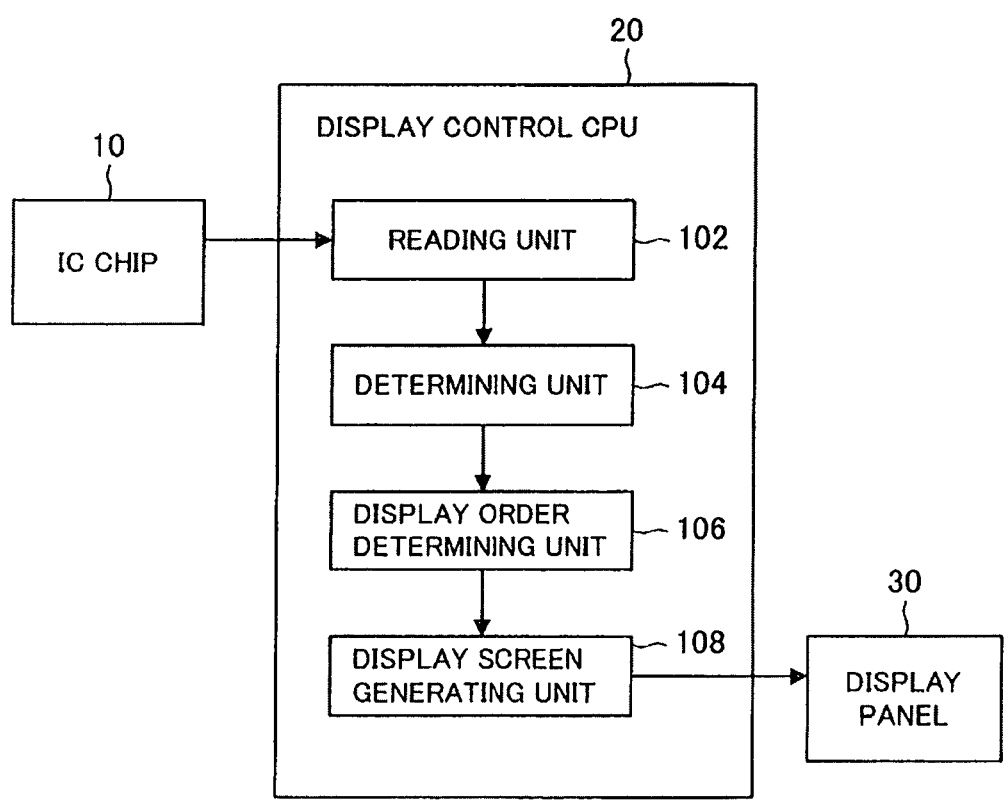
FIG. 2 is a block diagram showing a functional configuration of a display control CPU according to the first embodiment.

Next, a functional configuration of the display control CPU 20 will be described in detail with reference to FIG. 2. FIG. 2 is a block diagram showing a functional configuration of the display control CPU 20. As shown in FIG. 2, the display control CPU 20 includes a reading unit 102, a determining unit 104, a display order determining unit 106, and a display screen generating unit 108.

The reading unit 102 has a function of reading, from the IC chip 10 which is a storage unit of the display apparatus 100, information on electronic tickets stored in the IC chip 10. The reading unit 102 provides the information on electronic tickets read from the IC chip 10 to the determining unit 104. Now, the information on electronic tickets stored in the IC chip 10 will be described with reference to FIG. 3. FIG. 3 is an illustrative diagram for describing content of the information on electronic tickets stored in the IC chip 10. As shown in FIG. 3, information 200 on electronic tickets includes information to be written when issuing (purchasing) an electronic ticket, information to be written when entering an automatic ticket gate, information to be written when leaving an automatic ticket gate, etc.

The information to be written when issuing an electronic ticket includes, among the information 200 on electronic tickets, an issue flag 202, an unused flag 203, a date of purchase 206, an expected date of use 207, departure time 209, a boarding station 210, arrival time 211, an arrival station 212, a name of train 213, a car number 214, a seat number 215, a seat 216, etc. The information to be written when entering an automatic ticket gate includes an in-use flag 204, a date of use 208, etc. The information to be written when leaving an automatic ticket gate includes a used flag 205, etc.

Among the information 200 on electronic tickets, information other than flag information including the issue flag 202, the unused flag 203, the in-use flag 204, and the used flag 205 may need to be displayed on the display panel 30 as an electronic ticket. Flags including the unused flag 203, the in-use flag 204, and the used flag 205 are usage information indicating the state of use of an electronic ticket.

Figure 4:
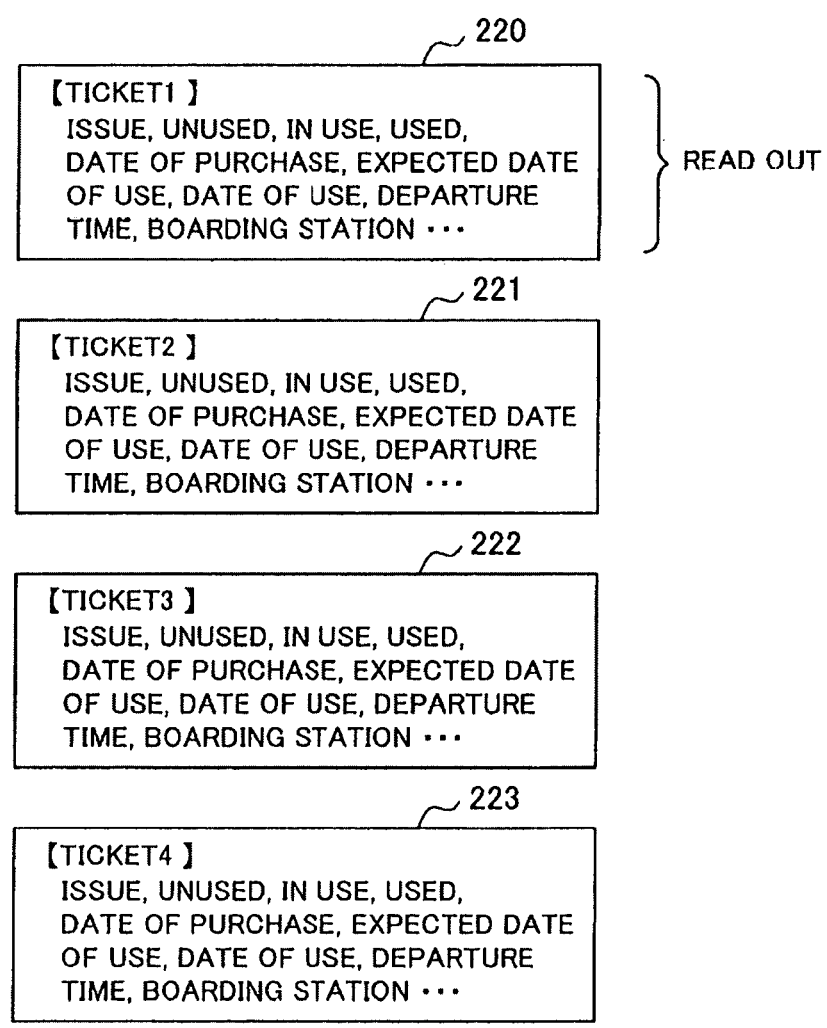
FIG. 4 is an illustrative diagram for describing a read unit of each piece of information on an electronic ticket according to the first embodiment.

Data to be read by the reading unit 102 is read per information 201 on an electronic ticket. A read unit of each piece of information on an electronic ticket will be described with reference to FIG. 4. FIG. 4 is an illustrative diagram for describing a read unit of each piece of information on an electronic ticket. As shown in FIG. 4, the reading unit 102 reads all information on electronic ticket #1, all information on electronic ticket #2, all information on electronic ticket #3, and all information on electronic ticket #4. The reading unit 102 may provide information on electronic tickets to the determining unit 104 per read unit or may collectively provide information on a plurality of electronic tickets to the determining unit 104.

Referring back to FIG. 2, the determining unit 104 has a function of determining whether the electronic tickets are in use based on the usage information of the electronic tickets included in the information on electronic tickets read by the reading unit 102. As described above, the usage state of an electronic ticket can be determined by which one of the flags including the unused flag 203, the in-use flag 204, and the used flag 205 is set. For example, when issuing a ticket only the unused flag 203 is set, when entering an automatic ticket gate the in-use flag 204 is set, and when leaving an automatic ticket gate the used flag 205 is set. Therefore, when the in-use flag 204 is set, the determining unit 104 can determine that the user has entered an automatic ticket gate and the electronic ticket is in use. When the used flag 205 is set, the determining unit 104 can determine that the user has left an automatic ticket gate and the electronic ticket has been used.

The display order determining unit 106 has a function of determining display order on a screen display of the electronic tickets based on results of the determination made by the determining unit 104. As described above, the determining unit 104 determines whether the electronic tickets stored in the IC chip 10 are in use. When there is an electronic ticket whose in-use flag 204 is set, it indicates that the user has entered an automatic ticket gate. In such a case, information on an electronic ticket that may be most needed to be displayed for the user is information on an electronic ticket to be used from now. Hence, the display order determining unit 106 gives the electronic ticket whose in-use flag 204 is set a high screen display priority.

Alternatively, according to a user input through the switch 40, only information on electronic tickets whose unused flags 203 are set may be displayed or only information on electronic tickets whose in-use flags 204 are set may be displayed or only information on electronic tickets whose used flags 205 are set may be displayed. In this case, display order of the electronic tickets may be determined further based on the date of use (date-of-use information) 208.

For example, display order is determined such that the electronic tickets whose unused flags 203 are set are arranged by earliest date of use 208 first, the electronic tickets whose in-use flags 204 are set are arranged by earliest date of use 208 first, and the electronic tickets whose used flags 205 are set are arranged by latest date of use 208 first. By this, information on an electronic ticket that may be most needed by the user can be given a high priority. The display order determining unit 106 notifies the display screen generating unit 106 of the determined display order.

The display screen generating unit 108 has a function of generating a display screen showing the electronic tickets according to the display order on the screen display determined by the display order determining unit 106, and providing the display screen to the display panel 30. The display screen generating unit 108 may successively generate a display screen showing a single electronic ticket or may generate a display screen showing a plurality of electronic tickets. Alternatively, the display screen generating unit 108 may generate, according to a user input, a display screen sequentially showing electronic tickets in descending order of the display order determined by the display order determining unit 106. Alternatively, according to a user input, only unused electronic tickets, only in-use electronic tickets, or only used electronic tickets may be displayed.

Figure 5:
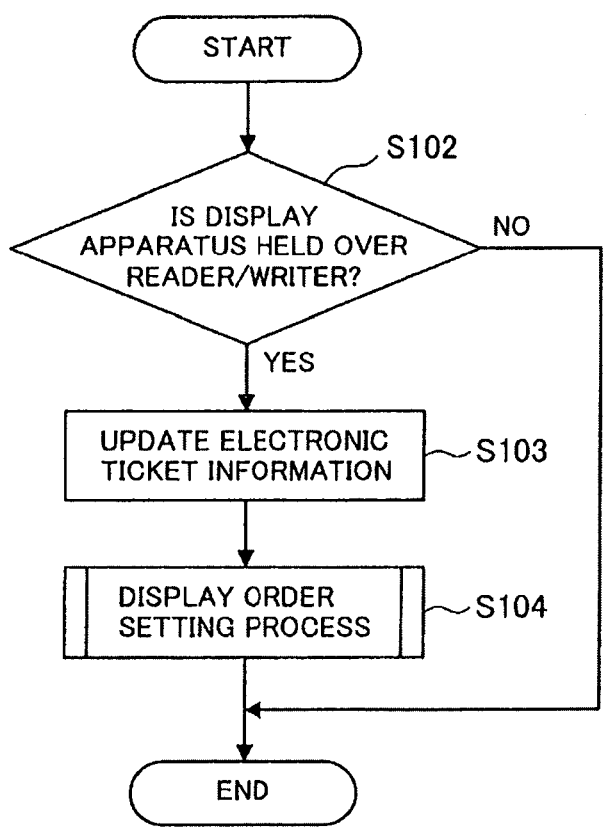
FIG. 5 is a flowchart showing a display method according to the first embodiment.
Figure 6:
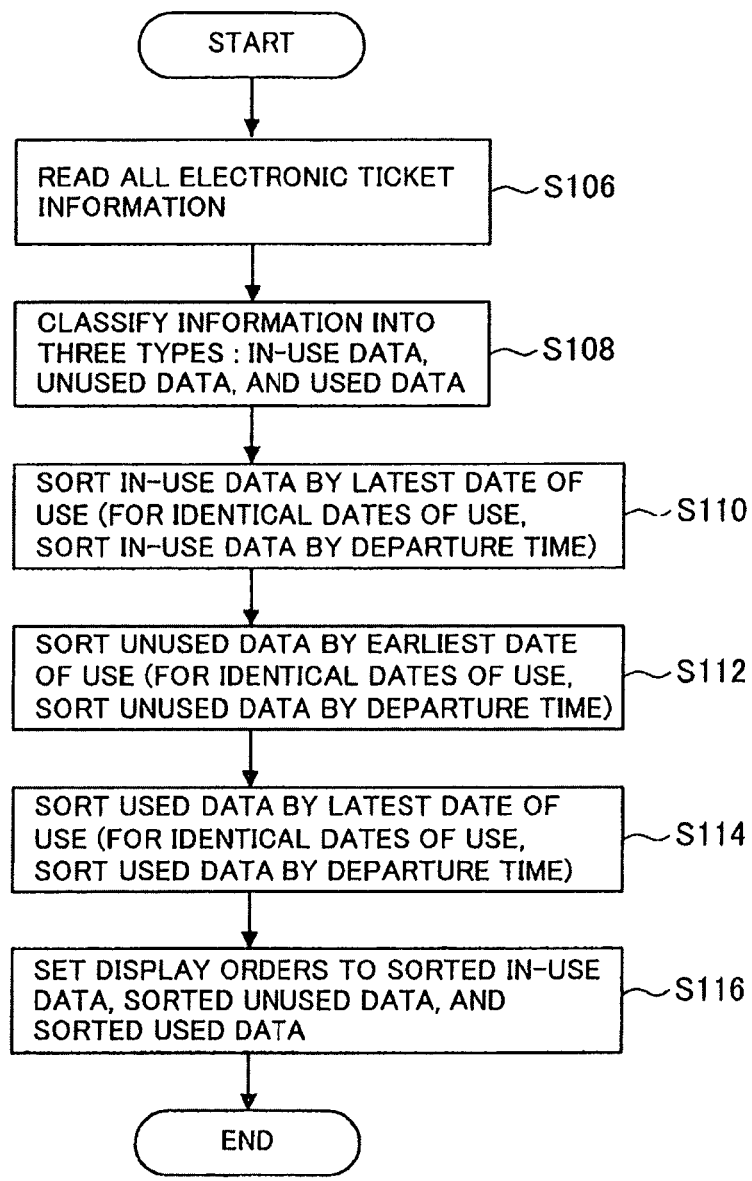
FIG. 6 is a flowchart showing a display method according to the first embodiment.
Figure 7:
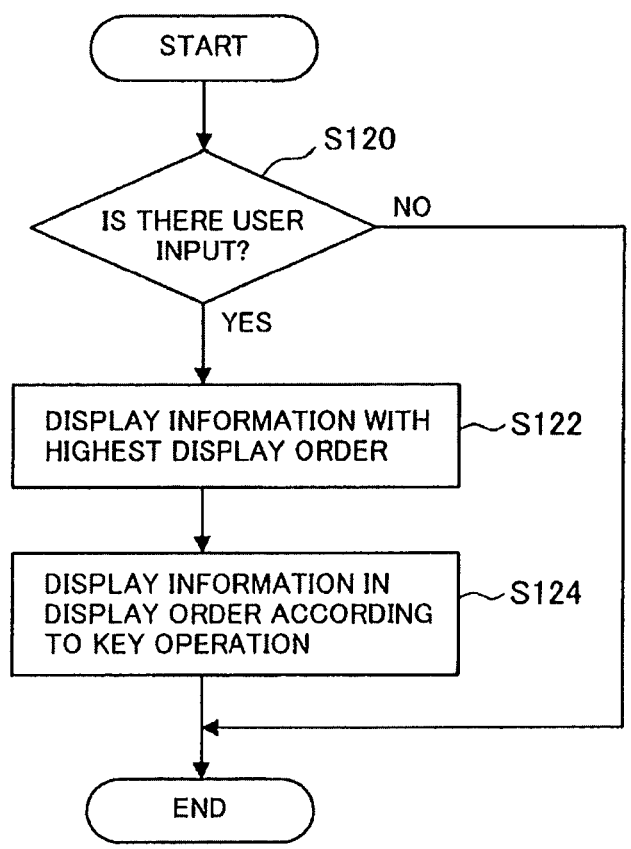
FIG. 7 is a flowchart showing a display method according to the first embodiment.

The functional configuration of the display control CPU 20 has been described above. Next, display methods performed by the display apparatus 100 will be described based on FIGS. 5 to 7. FIGS. 5 to 7 are flowcharts showing display methods performed by the display apparatus 100. As shown in FIG. 5, first, it is determined whether the display apparatus 100 is held over a reader/writer (S102). If it is determined at step S102 that the display apparatus 100 is held over a reader/writer, then information on electronic tickets stored in the IC chip 10 is updated by the external reader/writer or the like (S103). After the information on electronic tickets is updated at step S103, a display order setting process is performed (S104). The display order setting process at step S104 will be described in detail with reference to FIG. 6.

FIG. 6 is a flowchart showing a display order setting process performed by the display apparatus 100. As shown in FIG. 6, all information on electronic tickets stored in the IC chip 10 is read (S106). Then, based on flags indicating usage information (unused flags 203, in-use flags 204, and used flags 205), the information on electronic tickets is classified into three types of data: in-use data, unused data, and used data (S108).

Then, information on electronic tickets classified into the in-use data is sorted (arranged) by latest date of use first (S110). When, at step S110, the dates of use are identical, the information is sorted by latest departure time first. Subsequently, information on electronic tickets classified into the unused data is sorted by earliest date of use first (S112). When, at step S112, the dates of use are identical, the information is sorted by earliest departure time first. Then, information on electronic tickets classified into the used data is sorted by latest date of use first (S114). When, at step S114, the dates of use are identical, the information is sorted by latest departure time first.

Then, display orders of the respective three types of data classified at step S108 and sorted are respectively set to sorted in-use data, sorted unused data, and sorted used data (S116). The display order setting process has been described above. Next, an electronic ticket display method according to a user input will be described with reference to FIG. 7.

FIG. 7 is a flowchart showing an electronic ticket display method according to a user input. First, it is determined whether there is a user input (S120). The user input at step S120 indicates that a switch, a button, or the like, provided to the display apparatus 100 is pressed. For example, when the display panel is an LCD, etc., by pressing a switch, etc., display or non-display of information on electronic tickets may be performed.

If it is determined at step S120 that there is a user input, then information on an electronic ticket with the highest display order is displayed (S122). Then, according to a user's key operation, information on electronic tickets is displayed in display order that is previously set (S124). The electronic ticket display method according to a user input has been described.

The display apparatus 100 according to the first embodiment has been described above. According to the display apparatus 100, information on electronic tickets stored in the IC chip 10 is read and display order of the electronic tickets is determined based on usage information of the electronic tickets included in the information on electronic tickets, and then a display screen showing the electronic tickets is generated according to the display order. The usage information of electronic tickets is information indicating whether the electronic tickets are unused, in use, or used. On the display screen, an electronic ticket in use is displayed on a priority basis. Then, according to a user input, unused electronic tickets and used electronic tickets are sequentially displayed.

By this, information on an electronic ticket that may be most needed by the user can be displayed on a display screen on a priority basis. Also, according to a user input, information on electronic tickets can be sequentially displayed in descending order of priority. Accordingly, desired information can be provided to the user in a short time and with low power consumption.

In the first embodiment, all information on electronic tickets stored in the IC chip 10 is read and the display order on a screen display of the electronic tickets is determined. As described above, since the IC chip 10 uses a battery with low power consumption such as a solar cell, small power may need to be efficiently used. In view of this, in a second embodiment, by reading only information that may be needed to determine display order, consumption of resources such as power and a memory can be minimized.

(Second Embodiment)

A configuration of a display apparatus 100' according to the second embodiment of the present invention is substantially the same as that according to the first embodiment and thus a detailed description thereof is omitted. In the present embodiment, a method of reading information on electronic tickets which is different from that according to the first embodiment will be particularly described in detail. In the present embodiment, a reading unit 102 reads information on electronic tickets (hereinafter, referred to as display order information) that may be needed to determine display order. The information on electronic tickets that may be needed to determine display order includes, for example, among the information on electronic tickets shown in FIG. 3, issue flags 202, unused flags 203, in-use flags 204, used flags 205, expected dates of use 207, and departure times 209.

Figure 8:
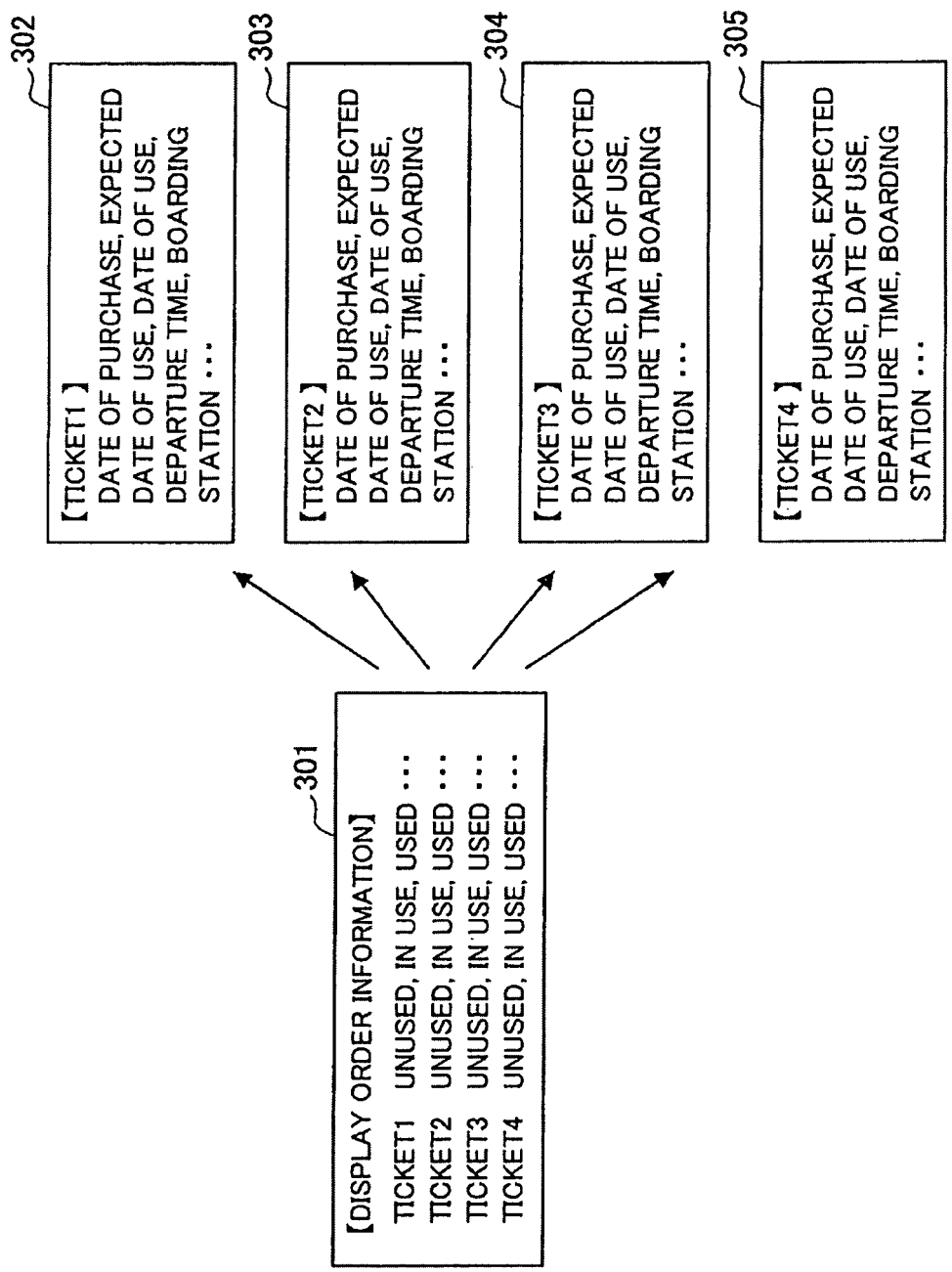
FIG. 8 is an illustrative diagram for describing display order information to be read by a reading unit according to a second embodiment of the present invention.

Next, display order information to be read by the reading unit 102 will be described with reference to FIG. 8. FIG. 8 is an illustrative diagram for describing display order information to be read by the reading unit 102. As shown in FIG. 8, display order information 301 includes, for example, issue flags 202, unused flags 203, in-use flags 204, used flags 205, expected dates of use 207, and departure times 209. The reading unit 102 reads only the display order information 301 and provides the display information 301 to a determining unit 104.

The determining unit 104 determines based on usage information flags included in the display order information 301 whether electronic tickets are in use. Then, a display order determining unit 106 determines display order of the electronic tickets according to the display order information 301. By this, without reading all information on electronic tickets, the display order of the electronic tickets can be determined, enabling to reduce the amount of resources used, such as power consumption and a memory.

A display screen generating unit 108 generates a display screen according to the display order determined by the display order determining unit 106. As shown in FIG. 8, for example, first, only the display order information 301 that may be needed to determine display order may be read from an IC chip 10 and upon generating a display screen, information on electronic tickets (any of 302 to 305) other than the display order information 301 may be read from the IC chip 10 and then a display screen may be generated. By this, when a user does not need to check all information stored in the IC chip 10, only such information on an electronic ticket that may be needed to be displayed is read, and thus, only by reading minimum necessary data, user's desired information can be efficiently displayed.

Next, a detail of the display order information 301 will be described with reference to FIG. 9. In the present embodiment, the following description is made assuming that writing to the IC chip 10 is performed in 16-byte unit. First, writing of display order information 301 and information 302 on an electronic ticket to the IC chip 10 will be described. Upon issuing an electronic ticket, content of the display order information 301 and content of the information 302 on an electronic ticket are transmitted to the display apparatus 100' from a ticket vending machine, etc.

The content of the display order information 301 transmitted from the ticket vending machine, etc., is written to a memory area of the IC chip 10 for writing display order information. At this time, when there is no written information on electronic tickets, the content is written to a memory area for "ticket #1". When there is already written information on electronic tickets, the content is written so as not to overlap with the written information on electronic tickets. When content of display order information is written to the memory, an address to write to is determined in advance. Also, for information on an electronic ticket other than the display order information, an address to write to is determined in advance or an address to which the information on an electronic ticket other than the display order information is written is written together with the display order information. By this, a memory area to which the information on an electronic ticket other than the display order information is written can be accessed based on the content of the display order information.

As shown in FIG. 9, for example, in the display order information 301, display order information on ticket #1 is assigned to the first to fourth bytes of the memory area of the IC chip 10 for writing display order information, display order information on ticket #2 to the fifth to eighth bytes, display order information on ticket #3 to the ninth to twelfth bytes, and display order information on ticket #4 to the thirteenth to sixteenth bytes. Together with the display order information on the respective electronic tickets, detailed data write destination addresses are also written.

Next, reading of display order information 301 and information 302 on an electronic ticket will be described. First, 16-byte display order information 301 is read from the memory area to which the display order information 301 is written. Then, display order is determined based on content of the display order information 301 in the above-described manner to identify an electronic ticket to be displayed. For example, when "ticket #1" is identified as an electronic ticket to be displayed, by referring to a "detailed data write destination address" of "ticket #1" included in the display order information 301, information 302 on an electronic ticket at the address is read. By this, by reading 16 bytes of display order information and thereafter reading 32 bytes of information on an electronic ticket to be displayed, user's desired information can be displayed without reading all data on electronic tickets.

Figure 10:
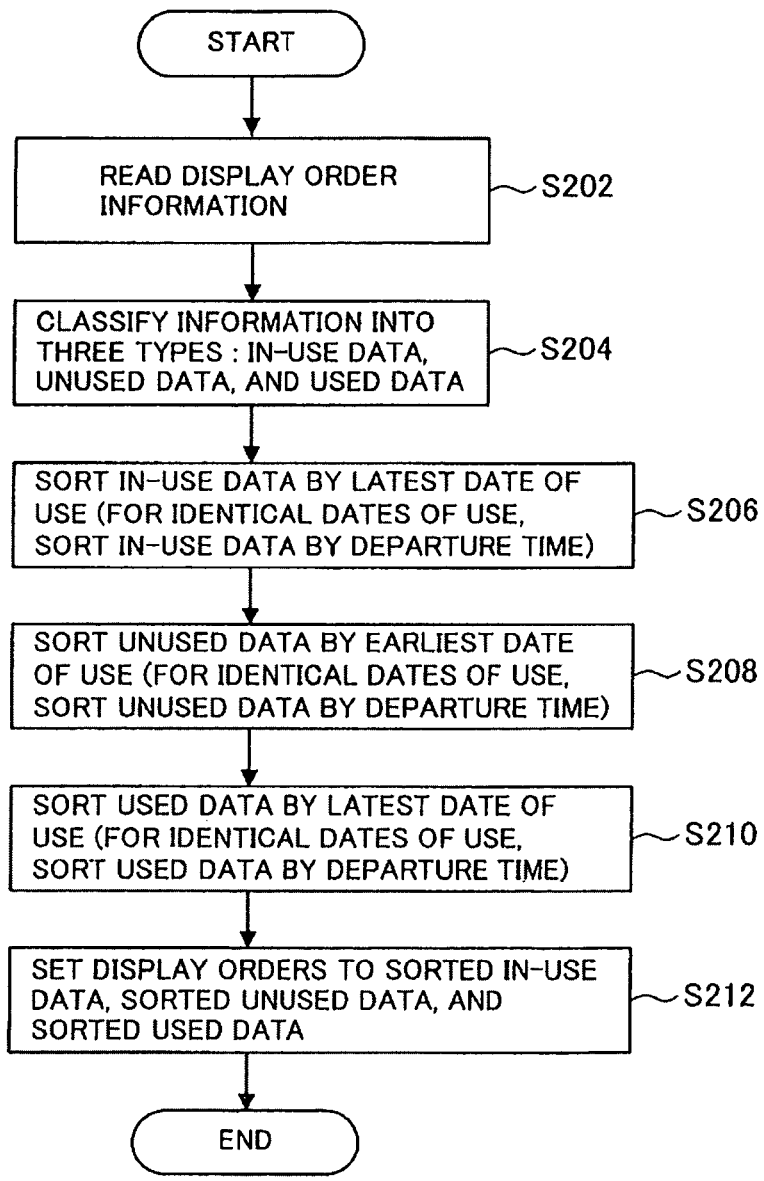
FIG. 10 is a flowchart showing a display method according to the second embodiment.
Figure 11:
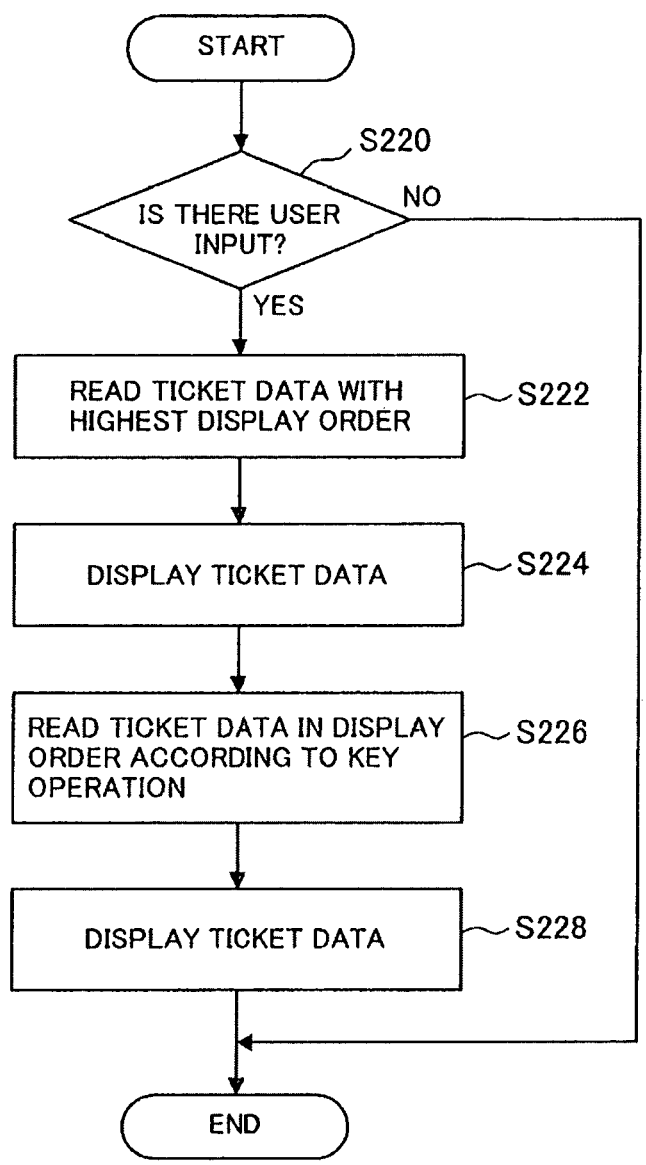
FIG. 11 is a flowchart showing a display method according to the second embodiment.

Next, display methods performed by the display apparatus 100' according to the present embodiment will be described based on FIGS. 10 and 11. FIGS. 10 and 11 are flowcharts showing display methods performed by the display apparatus 100'. Description of the display methods according to the present embodiment is made in detail particularly of differences from the display method according to the first embodiment. A process in which when the display apparatus 100' is held over a reader/writer information on electronic tickets stored in the IC chip 10 is updated by the external reader/writer, etc., is the same as that in the first embodiment.

FIG. 10 is a flowchart showing a display order setting process performed by the display apparatus 100'. As shown in FIG. 10, among information on electronic tickets stored in the IC chip 10, display order information is read (S202). Based on flags (unused flags 203, in-use flags 204, and used flags 205) indicating usage information and included in the display order information, the display order information is classified into three types of data: in-use data, unused data, and used data (S204).

Then, display order information classified into the in-use data is sorted (arranged) by latest date of use first (S206). When, at step S206, the dates of use are identical, the information is sorted by latest departure time first. Subsequently, display order information classified into the unused data is sorted by earliest date of use first (S208). When, at step S208, the dates of use are identical, the information is sorted by earliest departure time first. Then, display order information classified into the used data is sorted by earliest date of use first (S210). When, at step S210, the dates of use are identical, the information is sorted by earliest departure time first.

Then, display orders of the respective three types of data classified at step S204 and sorted are respectively set to sorted in-use data, sorted unused data, and sorted used data (S212). The display order setting process has been described above. Next, an electronic ticket display method according to a user input will be described with reference to FIG. 11.

FIG. 11 is a flowchart showing an electronic ticket display method according to a user input. First, it is determined whether there is a user input (S220). If it is determined at step S220 that there is a user input, then information on an electronic ticket with the highest display order is read (S222). Then, the information on an electronic ticket read at step S222 is displayed (S224). Subsequently, according to a user's key operation, information on electronic tickets is read in display order that is previously set (S226). Then, the information on electronic tickets read at step S226 is displayed (S228).

The display apparatus 100' according to the second embodiment has been described above. According to the display apparatus 100', among information on electronic tickets stored in the IC chip 10, display order information which is information on electronic tickets that may be needed to determine display order is read and display order is determined based on usage information flags included in the display order information. Then, a display screen is generated according to the determined display order.

By this, display order of electronic tickets can be determined without reading all information on electronic tickets stored in the IC chip 10, enabling to reduce the amount of resources used, such as power consumption and a memory. When a user does not need to check all information stored in the IC chip 10, only such information on an electronic ticket that may be needed to be displayed is read. Accordingly, only by reading minimum necessary data, user's desired information can be efficiently displayed.

It should be understood by those skilled in the art that various modifications, combinations, sub-combinations and alterations may occur depending on design requirements and other factors insofar as they are within the scope of the appended claims or the equivalents thereof.

Although in the above-described embodiments, for example, information on electronic tickets is stored in the IC chip 10, the present invention is not limited thereto. For example, information on movie tickets may be stored in the IC chip 10. Normally, when seeing a movie, entering a movie theater is checked but leaving the movie theater is not checked. Hence, with usage information for the case of storing movie tickets, it is difficult to determine whether an electronic ticket is in use and thus it is determined whether an electronic ticket is unused or used.

Therefore, the display order determining unit 106 can display information that may be most needed by a user, by giving information on an electronic ticket which is the earliest (used earliest) among unused electronic tickets, a high display order or giving information on an electronic ticket which is the latest (most recent) among used electronic tickets, a high display order.

What is claimed is:

1. A display apparatus, comprising:
a display screen; and
an integrated circuit (IC) chip that stores a plurality of electronic tickets,
wherein each electronic ticket of the plurality of electronic tickets includes usage information, address information, and first information which includes one of date of purchase, date-of-use, arrival time, departure time, boarding station, name of train, train number, car number, or seat number; and
one or more processors configured to:
read the usage information of each electronic ticket of the plurality of electronic tickets from the IC chip without reading the first information of each electronic ticket of the plurality of electronic tickets from the IC chip;
determine that each electronic ticket of the plurality of electronic tickets is one of an in-use ticket, a used ticket, or an unused ticket, based on the usage information read from the IC chip;
determine a display order of the plurality of electronic tickets based on the determination that each electronic ticket of the plurality of electronic tickets is one of the in-use ticket, the used ticket, or the unused ticket;
determine at least one electronic ticket from the plurality of electronic tickets based on the determined display order;
after the determination of the at least one electronic ticket from the plurality of electronic tickets based on the determined display order, read, from the IC chip, the first information of the at least one electronic ticket based on the address information associated with the at least one electronic ticket; and
control the display screen to display the first information of the at least one electronic ticket.

2. The display apparatus according to claim 1, wherein the one or more processors are further configured to:
determine, from the plurality of electronic tickets, the at least one electronic ticket as the in-use ticket; and
assign a higher priority to the at least one electronic ticket determined as the in-use ticket than the remaining of the plurality of electronic tickets.

3. The display apparatus according to claim 1, wherein the one or more processors are further configured to determine the display order in an order of in-use tickets, unused tickets, and used tickets.

4. The display apparatus according to claim 1, wherein the one or more processors are further configured to control the display screen to display the at least one electronic ticket that has a highest priority among the plurality of electronic tickets, based on the display order.

5. The display apparatus according to claim 1, wherein the one or more processors are further configured to control the display screen, based on a user input, to display the plurality of electronic tickets in a descending order of priority, wherein the descending order of the priority is based on the display order.

6. The display apparatus according to claim 1, wherein the one or more processors are further configured to determine the display order further based on the date-of-use of each electronic ticket of the plurality of electronic tickets.

7. The display apparatus according to claim 1, wherein the one or more processors are further configured to:
arrange electronic tickets that are determined as in-use tickets in a first chronological order which begins with an electronic ticket that has a latest date-of-use;
arrange electronic tickets that are determined as unused tickets in a second chronological order which begins with an electronic ticket that has an earliest date-of-use;
arrange electronic tickets that are determined as used tickets in a third chronological order which begins with an electronic ticket that has the latest date-of-use; and
determine the display order based on the arrangements.

8. The display apparatus according to claim 1, wherein the one or more processors are further configured to:
read display order information of each electronic ticket of the plurality of electronic tickets;
determine the display order of the plurality of electronic tickets based on the display order information of each electronic ticket of the plurality of electronic tickets; and
control the display screen to display the at least one electronic ticket corresponding to the display order information with a higher priority among the plurality of electronic tickets.

9. The display apparatus according to claim 1, wherein the one or more processors are further configured to:
receive newer usage information, newer address information, and newer first information of each electronic ticket of the plurality of electronic tickets from a reader/writer;
update the IC chip with the newer usage information, the newer address information, and the newer first information of each electronic ticket of the plurality of electronic tickets; and
classify and determine the display order based on the updated newer usage information.

10. The display apparatus according to claim 1, wherein each electronic ticket of the plurality of electronic tickets comprises information associated with at least one of an unused flag, an in-use flag, an issue flag, or a used flag.

11. The display apparatus according to claim 1, wherein the one or more processors are further configured to determine a usage state of each electronic ticket of the plurality of electronic tickets based on the usage information.

12. The display apparatus according to claim 1, wherein the one or more processors are further configured to store, on the IC chip, the usage information, the address information, and the first information of each electronic ticket of the plurality of electronic tickets.

13. A display method, comprising:
in a display apparatus including an integrated circuit (IC) chip and a display screen:
storing a plurality of electronic tickets on the IC chip, wherein each electronic ticket of the plurality of electronic tickets includes usage information, address information, and first information which includes one of date of purchase, date-of-use, arrival time, departure time, boarding station, name of train, train number, car number, or seat number;
reading the usage information of each electronic ticket of the plurality of electronic tickets from the IC chip without reading the first information of each electronic ticket of the plurality of electronic tickets from the IC chip;
determining that each electronic ticket of the plurality of electronic tickets is one of an in-use ticket, a used ticket, or an unused ticket, based on the usage information read from the IC chip;
determining a display order of the plurality of electronic tickets based on the determination that each electronic ticket of the plurality of electronic tickets is one of the in-use ticket, the used ticket, or the unused ticket;
determining at least one electronic ticket from the plurality of electronic tickets based on the determined display order;
after the determination of the at least one electronic ticket from the plurality of electronic tickets based on the determined display order, reading, from the IC chip, the first information of the at least one electronic ticket based on the address information associated with the at least one electronic ticket; and
controlling the display screen to display the first information of the at least one electronic ticket.

14. A non-transitory computer-readable medium having stored thereon computer-executable instructions which, when executed by a computer, cause the computer to execute operations, the operations comprising:
storing a plurality of electronic tickets on an integrated circuit (IC) chip,
wherein each electronic ticket of the plurality of electronic tickets includes usage information, address information, and first information which includes one of date of purchase, date-of-use, arrival time, departure time, boarding station, name of train, train number, car number, or seat number;
reading the usage information of each electronic ticket of the plurality of electronic tickets from the IC chip without reading the first information of each electronic ticket of the plurality of electronic tickets from the IC chip;
determining that each electronic ticket of the plurality of electronic tickets is one of an in-use ticket, a used ticket, or an unused ticket, based on the usage information read from the IC chip;
determining a display order of the plurality of electronic tickets based on the determination that each electronic ticket of the plurality of electronic tickets is one of the in-use ticket, the used ticket, or the unused ticket;
determining at least one electronic ticket from the plurality of electronic tickets based on the determined display order;
after the determination of the at least one electronic ticket from the plurality of electronic tickets based on the determined display order, reading, from the IC chip, the first information of the at least one electronic ticket based on the address information associated with the at least one electronic ticket; and
controlling a display screen to display the first information of the at least one electronic ticket.

15. A display system, comprising:

a display apparatus comprising an integrated circuit (IC) chip and a display screen, wherein the IC chip is configured to execute non-contact communication;

a reader/writer configured to execute the non-contact communication with the IC chip; and a server apparatus connected to the reader/writer, wherein a plurality of electronic tickets transmitted from the server apparatus through the reader/writer are stored in the IC chip, wherein each electronic ticket of the plurality of electronic tickets includes usage information, address information, and first information which includes one of date of purchase, date-of-use, arrival time, departure time, boarding station, name of train, train number, car number, or seat number; and wherein the display apparatus further comprises:

one or more processors configured to:

read the usage information of each electronic ticket of the plurality of electronic tickets from the IC chip without reading the first information of each electronic ticket of the plurality of electronic tickets from the IC chip;

determine that each electronic ticket of the plurality of electronic tickets is one of an in-use ticket, a used ticket, or an unused ticket, based on the usage information read from the IC chip;

determine a display order of the plurality of electronic tickets based on the determination that each electronic ticket of the plurality of electronic tickets is one of the in-use ticket, the used ticket, or the unused ticket;

determine at least one electronic ticket from the plurality of electronic tickets based on the determined display order;

after the determination of the at least one electronic ticket from the plurality of electronic tickets based on the determined display order, read, from the IC chip, the first information of the at least one electronic ticket based on the address information associated with the at least one electronic ticket; and control the display screen to display the first information of the at least one electronic ticket.

\* \* \* \* \*